US010503475B1

(12) United States Patent
Mascagni

(10) Patent No.: US 10,503,475 B1
(45) Date of Patent: Dec. 10, 2019

(54) FORENSICALLY REPRODUCIBLE RANDOM NUMBER GENERATOR AND ASSOCIATED METHOD OF USE

(71) Applicant: The Florida State University Research Foundation, Inc., Tallahassee, FL (US)

(72) Inventor: Michael V. Mascagni, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 7 days.

(21) Appl. No.: 15/808,030

(22) Filed: Nov. 9, 2017

Related U.S. Application Data

(60) Provisional application No. 62/419,734, filed on Nov. 9, 2016.

(51) Int. Cl.
*G06F 7/58* (2006.01)
(52) U.S. Cl.
CPC ........ *G06F 7/588* (2013.01); *G06F 2207/582* (2013.01)
(58) Field of Classification Search
CPC ............................ G06F 7/588; G06F 2207/582
USPC ........................................................ 708/250
See application file for complete search history.

(56) References Cited

U.S. PATENT DOCUMENTS

| | | | | |
|---|---|---|---|---|
| 7,571,199 B1* | 8/2009 | Field | ........................ | G06F 7/588 708/250 |
| 2007/0230694 A1* | 10/2007 | Rose | ......................... | G06F 7/58 380/46 |
| 2007/0294508 A1* | 12/2007 | Sussman | ................. | G06F 7/582 712/11 |
| 2008/0256151 A1* | 10/2008 | Acar | ......................... | G06F 7/58 708/250 |
| 2008/0263117 A1* | 10/2008 | Rose | ....................... | G06F 7/582 708/254 |
| 2014/0344321 A1* | 11/2014 | Hamilton | ................ | G06F 7/588 708/255 |

OTHER PUBLICATIONS

Intel® Digital Random Number Generator (DRNG) Software Implementation Guide, Revision 1.1, 2012 (Year: 2012).*
M. Mascagni, Algorithm 806: SPRNG: A Scalable Library for Pseudorandom Number Generation, ACM Transactions on Mathematical Software, vol. 26, No. 3, 2000, p. 436-461 (Year: 2000).*
See N. Gigante, Introduction to Pseudo-Random Number Generators, http://users.dimi.uniud.it/~alberto.policriti/home/sites/default/files/ASD/prng-slides.pdf Mar. 9, 2016, p. 25 (Year: 2016).*

(Continued)

*Primary Examiner* — Andrew Caldwell
*Assistant Examiner* — Emily E Larocque
(74) *Attorney, Agent, or Firm* — Meunier Carlin & Curfman LLC

(57) ABSTRACT

Unpredictable random numbers are used to provide the parameter values and seeds for a parameterized random number generator, thereby providing forensic reproducibility of a simulation. The values generated unpredictably to provide the parameters and seeds for the random number generator are stored so that the same random numbers can be utilized for a subsequent computation in the simulation.

20 Claims, 3 Drawing Sheets

(56) References Cited

OTHER PUBLICATIONS

S. Salleh, Monte Carlo Simulation Tips and Tricks, http://decision-analytics-blog.lumina.com/category/risk-and-uncertainty, 2013 (Year: 2013).*

J. Chan, et al., Ensuring Quality of Random Numbers from TRNG: Design and Evaluation of Post-Processing Using Genetic Algorithm, Journal of Computer and Communications, Apr. 8, 2016 (Year: 2016).*

Mascagni and Chi. Parallel linear congruential generators with Sophie-Germain moduli. Parallel Computing. 2004. vol. 30: 1217-1231.

Mascagni et al., A fast, high quality, and reproducible parallel lagged-Fibonacci pseudorandom number generator. Journal of Computational Physics. 1995. vol. 119: 211-219.

Salmon et al., Parallel random numbers: As easy as 1, 2, 3. Proceedings of 2011 International Conference for High Performance Computing, Networking, Storage and Analysis (SC '11). 2011: 1-12.

* cited by examiner

FORENSICALLY REPRODUCIBLE RANDOM NUMBER GENERATOR AND ASSOCIATED METHOD OF USE

CROSS-REFERENCE TO RELATED APPLICATIONS

The present application claims priority to provisional U.S. Patent Application Ser. No. 62/419,734 filed on Nov. 9, 2016, titled, "Reproducible Random Number Generation Using Unpredictable Random Numbers," which is hereby incorporated by reference in its entirety.

BACKGROUND OF THE INVENTION

As shown in FIG. 1, computational random numbers can be roughly broken down into three categories, based upon which property of randomness they optimize: independence, uniformity, or unpredictability. The optimization of the first two properties, independence and uniformity, lead to deterministic random numbers known as pseudorandom and quasi-random numbers, respectively. Randomization of the third property, unpredictability, is the basis of cryptographic random numbers and historically, randomization based on unpredictability may or may not be deterministic. However, due to the standardization of cryptographic random numbers, standards-compliant cryptographic random number generators are based on numbers derived from physically random sources of entropy. Random numbers based upon numbers derived from physically random sources, are commonly referred to as "real" random numbers.

The history of real random numbers is rather unremarkable, as "real" random numbers resulting from physically random sources may include, radioactive decay, thermal noise and a host of other physical sources of randomness, have mostly failed to produce random numbers that can pass rather ordinary tests of randomness. The issue with lack of true randomness in these real random number is commonly a result of the process of measuring the physical process purported to be random, invariably introducing significant measurement error and bias. This result has lead to the requirement in the field that "truly random" numbers be subject to considerable post-processing to ensure that the final output can pass rigorous tests of randomness.

As such, the standard for cryptographic random numbers advocated by the National Institute of Standards and Technology (NIST) Computer Security Group explicitly requires a source of "real" numbers as input to extensive back-end processing to ensure that the final output passes tests of randomness. One such "real" random number generator is the Intel Digital Random Number Generator (DRNG). The Intel® DRNG generates true random numbers using a processor resident entropy source to seed a hardware-implemented random number generator. Unlike software approaches, the DRNG utilizes a high-quality entropy source that can be sampled quickly to repeatedly seed a cryptographically secure random number generator with high-quality entropy.

However, while high-quality random number generators are known in the art, random numbers used for simulation purposes need to be reproducible for a variety of reasons. Thus, cryptographic random numbers are fundamentally inappropriate for simulations requiring reproducibility of results. Yet, modern cryptographic random numbers, such as those generated by the Intel® DRNG are much easier to obtain in simulation settings, and as such, there has been considerable interest in finding ways to appropriately use them in simulations requiring reproducibility.

Accordingly, what is needed in the art is a system and method for generating cryptographic random numbers that can be reproduced for use in simulation environments requiring reproducible results.

SUMMARY OF INVENTION

In various embodiments, the present invention provides a system and method for generating reproducible cryptographic random numbers for use in simulation environments requiring reproducible results.

In accordance with the present invention, each time in a computation where a new random number stream is required, the initialization of the parameterized random number generator relies on an unpredictable sequence of bits produced by the unpredictable random number generator and the initialization bits used for the unpredictable random number generator are stored in memory. Since the number of bits the parameterized random number generator can generate is enormous, while the number of bits required from the unpredictable random number generator to initialize the parameterized random number generator is on the order of kilobits, hence the number of bits required to initialize the parameterized random number generator can be stored in memory. The stored bits can then be used to rerun the computations of the simulation in a reproducible after the fact.

In a specific embodiment, the present invention provides, a computer implemented method for generating random numbers for configuring a forensically reproducible simulation which includes, constructing, by a computer processing system, an unpredictable random number generator and a parameterized random number generator and generating, by the unpredictable random number generator of the computer processing system, a plurality of unpredictable random numbers, wherein each of the plurality of unpredictable random numbers comprises a plurality of bits and outputting, by the unpredictable random number generator of the computer processing system, the plurality of unpredictable random numbers to a memory of the computer processing system. Additionally, when a reproducible random number is required for a forensically reproducible simulation executing on the computer processing system, the method further includes, selecting one of the plurality of unpredictable random numbers stored in the memory of the computer processing system, initializing the parameterized random number generator of the computer processing system using the selected one of the plurality of unpredictable random numbers, generating, by the parameterized random number generator of the computer processing system, a parameterized random number based upon the selected one of the plurality of unpredictable random numbers and configuring the forensically reproducible simulation executing on the computer processing system using the parameterized random number generated by the parameterized random number generator of the computer processing system.

In subsequent runs of the simulation, the method may further include selecting the same one of the plurality of unpredictable random numbers stored in the memory of the computer processing system to initialize the parameterized random number generator for a rerun of the simulation.

In a specific embodiment, a seed value for the unpredictable random number may be generated based upon one or more physical entropy sources, including, but not limited to, radioactive decay, a quantum effect, electronic noise, air turbulence, movement of a tracking device mouse strokes and timing between keyboard keystrokes.

In an additional embodiment, the present invention provides, a computer processing system, including a processor and a memory coupled to processor. The memory stores program instructions executable by the processor to implement, constructing an unpredictable random number generator and a parameterized random number generator, generating a plurality of unpredictable random numbers, wherein each of the plurality of unpredictable random numbers comprises a plurality of bits, outputting the plurality of unpredictable random numbers to the memory of the computer processing system. And, when a reproducible random number is required for a forensically reproducible simulation executing on the computer processing system, the program instructions executing by the processor further implement, selecting one of the plurality of unpredictable random numbers stored in the memory of the computer processing system, initializing the parameterized random number generator of the computer processing system using the selected one of the plurality of unpredictable random numbers, generating, by the parameterized random number generator of the computer processing system, a parameterized random number based upon the selected one of the plurality of unpredictable random numbers; and configuring the forensically reproducible simulation executing on the computer processing system using the parameterized random number generated by the parameterized random number generator of the computer processing system.

In another embodiment, the present invention provides a non-transitory, computer-readable storage medium comprising program instructions stored thereon, wherein the program instructions are configured to implement, constructing an unpredictable random number generator and a parameterized random number generator, generating a plurality of unpredictable random numbers, wherein each of the plurality of unpredictable random numbers comprises a plurality of bits and outputting the plurality of unpredictable random numbers to the memory of the computer processing system. Additionally, when a reproducible random number is required for a forensically reproducible simulation executing on the computer processing system, the program instructions executing by the processor further implement, selecting one of the plurality of unpredictable random numbers stored in the memory of the computer processing system, initializing the parameterized random number generator of the computer processing system using the selected one of the plurality of unpredictable random numbers, generating, by the parameterized random number generator of the computer processing system, a parameterized random number based upon the selected one of the plurality of unpredictable random numbers and configuring the forensically reproducible simulation executing on the computer processing system using the parameterized random number generated by the parameterized random number generator of the computer processing system.

In a specific embodiment, the present invention provides for the use of the Intel DRNG (Digital Random Number Generator), as an instance of an unpredictable random number generator, in combination with the Scalable Parallel Random Number Generators (SPRNG) library to generate cryptographic random numbers to be used for reproducible simulations.

Accordingly, the present invention provides a system and method for using cryptographic random number in simulation settings.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PRESENT INVENTION

Figure 1:
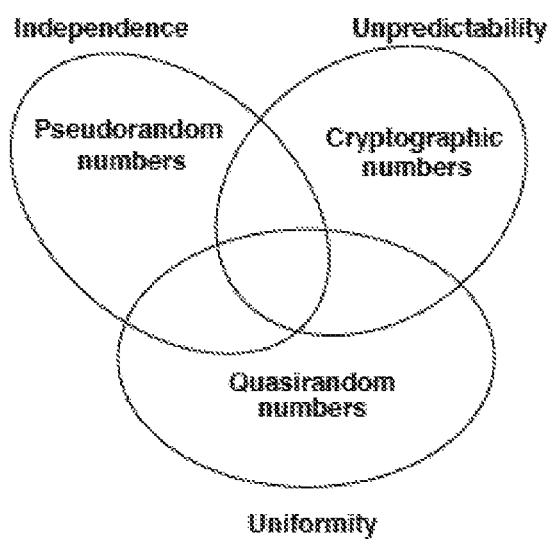
FIG. 1 is a diagram illustrating various computational random numbers with randomness descriptors, as is known in the art.

There has always been a desire to use a physical source of randomness as the basis for producing computational random numbers. However, in the recent past, this was not possible for several reasons. The first is that physical sources of randomness must be measured before they can be converted into random numbers. The process of measurement is subject to many uncontrollable variables and so the numbers produced by the simple measurement of physically random processes were invariably highly biased and certainly no better than high-quality pseudorandom numbers, which were readily available at the time. The approach that was used to mitigate this situation was to subject the numbers produced by these physical measurements to considerable software post-processing. While the addition of post-processing produced much higher quality random numbers, they were not produced at a rate that was sufficient for computational applications.

The use of random numbers in simulations is widespread and is crucial in a large number of applications. In simulations, it is equally important that applications using random number are reproducible. The requirement of reproducibility is important for several reasons: (1) Code development and debugging would be nearly impossible without reproducible random numbers, (2) Many simulations applications require absolute reproducibility in certification situations, such as those mandated by the Nuclear Regulatory Commission, (3) Publication in many journals now has a code reproducible mandate, such as the Association for Computing Machinery (ACM) Transactions on Mathematical Software. The requirement for reproducible random numbers has led to many new and very capable random number designed primarily for cryptographic use, and as such unpredictable, to be deemed inadequate for reproducible simulations purposes.

There are compelling reasons to consider adapting random numbers for simulation to incorporate unpredictable random numbers. The first is that a major assumption that argued strongly against their use in simulation no longer holds. Specifically, this was the argument that unpredictable random numbers, whether originating from "real" sources of randomness, or as an output of cryptographic transformations, were too slow and otherwise expensive for simulation, as compared with pseudorandom number generators. However, in the very recent past, unpredictable random number generators have overcome the quality and speed issues that were previously identified. A good example of this is the Intel® Digital Random Number Generator (DRNG). The Intel DRNG has multi-gigabit per second output, invaliding the assumption for numbers from "real" sources of randomness. In addition, many cryptographic primitives are now directly supported as hardware instructions in both the Intel® and the AMD® architectures. Thus, the cost of producing bits via cryptographic means, such as the Advanced Encryption Standard (AES) or through the use of the Secure Hash Algorithm (SHA) are now almost comparable to some of the best pseudorandom number generators. In fact, the Random123 generator, which provides a library of "counter-based" random number generators (CBRNGs), is one example of a very well-performing random number generation package based on reversible cryptographic transformations enabled by the inclusion of cryptographic primitives as hardware instructions.

Perhaps the most important reason to consider the use of non-reproducible random numbers in simulation is the fact that they are already being used, and it is expected that their use will increase. More specifically, the use of non-reproducible random numbers is evident in lottery drawings and in electronic games of chance. In the not too recent past, pseudorandom numbers were used in lotteries. However, the trend now is to use non-reproducible random numbers in systems that produce random numbers used in lottery drawings. This is due to the reasons mentioned above, along with the belief that unpredictable random numbers are philosophically better, since they are unknowable until the point when they are generated. This fulfills a need in this community, but eschews the ability to audit certain lottery draws. This issue is actually very similar to the need for reproducibility in random numbers for simulation.

In various embodiments of the present invention an unpredictable random number generator is used to initialize a parameterized random number generator to generate reproducible random numbers that can be used in simulations requiring reproducible results.

In a specific embodiment, the parameterized random number generator is the Scalable Parallel Random Number Generators (SPRNG) library that is known to be used to produce pseudo-random numbers (PRNs) on a variety of high-performance platforms and is the default random number generator in a very large number of applications across many disciplines. In the Scalable Parallel Random Number Generators (SPRNG) library, which was developed by the author of the present invention (M. Mascagni and A. Srinivasan (2000), "Algorithm 806: SPRNG: A Scalable Library for Pseudorandom Number Generation," ACM Transactions on Mathematical Software, 26: 436-461), has the capability to produce independent full-period random number streams based on parameterization. The parameter can be thought of as a very long integer, and SPRNG currently assigns parameters to streams.

The Scalable Parallel Random Number Generator (SPRNG) was designed for distributed memory multiprocessors, and is based on the unique concept of parameterized random number generators (RNGs). In accordance with SPRNG, pseudorandom numbers are generated through recursions that require a certain number of previously computed values to be stored as the RNG's state or seed. The originality of SPRNG is that the ability to simultaneously produce many streams of high-quality pseudorandom numbers arises from the ability to parameterize the RNGs so that each parallel stream arises from a unique parameter assignment. In contrast with a traditional random number generator (RNG), wherein the seed is the RNG's starting value, with a parameterized random number generator, such as the Scalable Parallel Random Number Generator (SPRNG), the seed is augmented with the RNG parameter.

Figure 2:
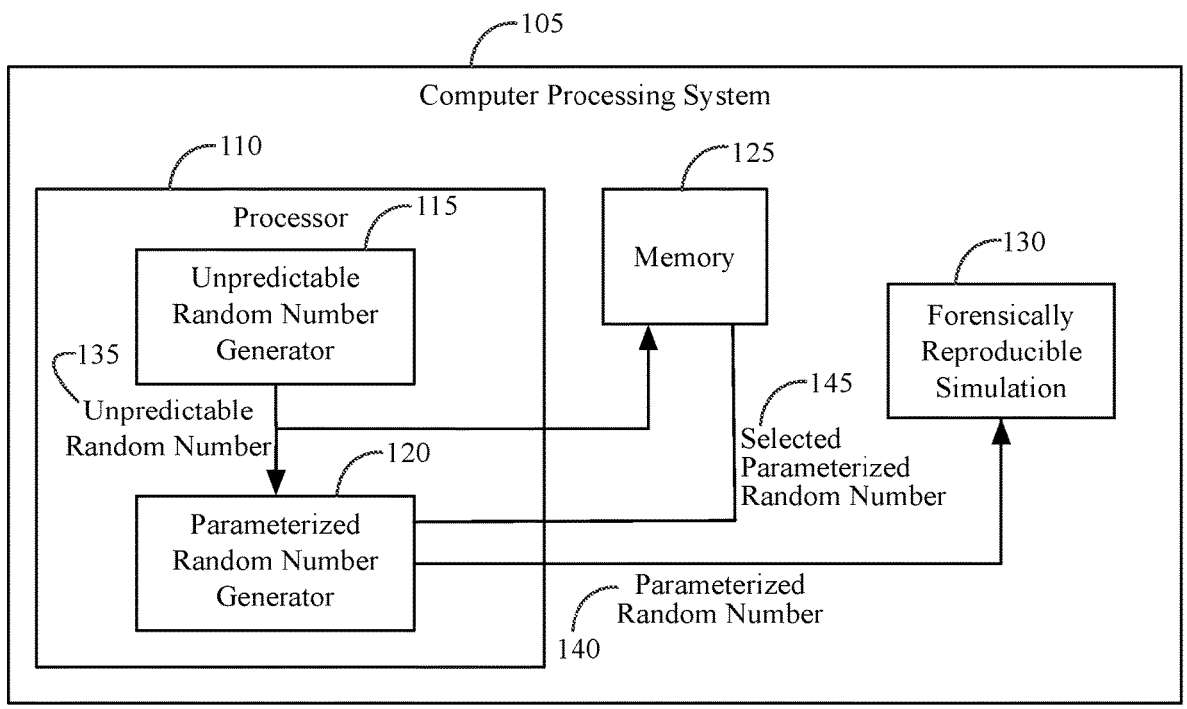
FIG. 2 is a block diagram illustrating a method for generating random numbers for a forensically reproducible simulation, in accordance with an embodiment of the present invention.

With reference to FIG. 2, a computer processing system 105 in accordance with the present invention includes, a processor 110 and a memory 125 coupled to processor 110. The memory comprises program instructions executable by the processor to construct an unpredictable random number generator 115 and a parameterized random number generator 120. The program instructions executable by the processor also generate a plurality of unpredictable random numbers 135 using the unpredictable random number generator 115, wherein each of the plurality of unpredictable random numbers comprises a plurality of bits and output the plurality of unpredictable random numbers to the memory 125 of the computer processing system 105. Additionally, when a reproducible random number is required for a forensically reproducible simulation 130 executing on the computer processing system 105, the program instructions executing by the processor further select one of the plurality of unpredictable random numbers 145 stored in the memory 125 of the computer processing system 105, initialize the parameterized random number generator 120 of the computer processing system 105 using the selected one of the plurality of unpredictable random numbers 145 and generate, by the parameterized random number generator 120 of the computer processing system 105, a parameterized random number 140 based upon the selected one of the plurality of unpredictable random numbers 145 and configure the forensically reproducible simulation 130 executing on the computer processing system 105 using the parameterized random number 140 generated by the parameterized random number generator 120 of the computer processing system 105.

In a particular embodiment, the unpredictable random number generator 115 is an Intel® DRNG and the parameterized random number generator 120 is the SPRNG. As such, the present invention incorporates the fast and high-quality output of the DRNG into the SPRNG random number generators to produce high quality and completely reproducible PRNs. Thereby creating a new and unique capability in random number generation, and providing the opportunity for research, and the eventual development of a commercial version of the SPRNG library. One can use an unpredictable RNG to produce the parameters in SPRNG, and by augmenting the SPRNG RNG data structure, this can be done in a reproducible way. The reproducibility will be of the so-called forensic type, and reproducing the results will require the use and design of extra software to collect the parameters used in a computation, and to stage a new computation with the same parameters.

Maintaining reproducibility in random number generation for simulation is very desirable. Accordingly, various embodiments of the present invention provide for the use of an unpredictable random number stream, within SPRNG, to produce high-quality parallel random number streams that are absolutely reproducible.

To understand issues of reproducibility with random number generators, the following example is provided as an illustration. Consider the most common pseudorandom number generator type, the linear congruential generator (LCG) defined by the following modular recurrence:

$$x_{n+1} = ax_n + b \pmod{m} \tag{1}$$

This is a recurrence because the next random number, $x_{n+1}$ depends on previous values that have been generated, specifically, $x_n$. More specifically, this recurrence requires that one value, $x_n$, is saved and has recurrence parameters a, b, and m. The particular LCG in this embodiment is defined by these parameters, and as such, this particular LCG is defined via its parameters as: LCG (a, b, m). By choosing the parameters correctly, using number theoretic criteria, one can achieve a sequence with high quality and single maximal period. Thus, a new seed, $x_n$, only chooses a new starting point in the single period sequence, whereas, new parameters allow for a completely different maximal period cycle. As such, this LCG is defined by its parameters, a, b, m, and by a value in the sequence. Thus, in order to be able to reproduce the random numbers generated by this generator, it is necessary to have both the parameters (a, b, m) and an initial value, $x_0$, which is commonly referred to as the seed. If one saves both the parameters (a, b, m) and the seed ($x_0$), then the numbers generated started from the seed can be reproduced. So, to reproduce a stream produced by LCG (a, b, m,) it needs to be initialized with a saved initial value. Thus, the LCG may be referred to in the following way: LCG (a, b, m; $x_0$). Here, the first values are the parameters, and the data after the semicolon is the seed or state.

There are essentially two ways of creating multiple streams from a single pseudorandom number generator: (1) cycle splitting and (2) parameterization. The following discussion illustrates these concepts utilizing the LCG described above.

Like most pseudorandom number generators, the LCG is purely periodic in the sense that after the period length, Per($\{x_n\}$)=P, thus giving, $x_{n+p}=x_n$ for all n. For example, for LCG (a, b, m; $x_0$). with m prime and a chosen to give the maximal period, and therefore, Per($\{x_n\}$)=m−1. Thus, the numbers produced by LCG (a, b, m; $x_0$) can be visualized as a circle of integers with circumference equal to the period.

In cycle splitting, the method can be thought of as producing subsequences from the output of the single full-period pseudorandom number generator as a variation on card dealing. Assuming that each card in the deck has a different random number on it, and that the deck is periodic. It is desired to provide subsequences for different processors by thinking of each processor as a card player, and the cards dealt out to them as their random number subsequence. Then the ways of producing subsequences if obvious. The first is the leap-frog technique. Assume that it is necessary to provide l subsequences of length L, then the numbers are dealt out to obtain:

First subsequence: $\{x_0, x_l, x_{2l} \ldots, x_{(L-1)l}\}$
Second subsequence: $\{x_1, x_{1+l}, x_{1+2l} \ldots, x_{1+(L-1)l}\}$
...
$i^{th}$ subsequence: $\{x_i, x_{i+l}, x_{i+2l} \ldots x_{i+(L-1)l}\}$
...

If instead, if it is desired to use the blocking method to create subsequences, the following subsequences are obtained:

First subsequence: $\{x_0, x_1, \ldots, x_{L-1}\}$
Second subsequence: $\{x_L, x_{L+1}, \ldots, x_{2L-1}\}$
...
$i^{th}$ subsequence: $\{x_{(i-1)L}, x_{(i-1)L+1}, \ldots x_{iL-1}\}$
...

Cycle splitting is a common method used to make many subsequences from a single full-period generator, but it has many deficiencies, and it NOT the main method used for producing parallel subsequences in SPRNG.

In the present invention SPRNG utilizes a novel technique for parallelization called parameterization. Consider the LCG of the exemplary embodiments: LCG (a, b, m; $x_0$). This notation describes a pseudorandom number generator (PRNG) in the form PRNG(P; S), where P are the generator's parameters, and S, the generator's seed. In cycle splitting, the seed is manipulated to jump around the full-period circle of random numbers to create subsequences. A good example of how this works is beyond the scope of this document, but a good example of parameterizing an LCG can be found in previous work by the author.

The two major ideas that need to be understood regarding parameterization are the following. First, by taking a PRNG and finding ways to parameterize it, the parameter values can be systematically changed so that each new parameter setting produces a completely different full-period PRNG. This is very significant, since with cycle splitting, a single full-period generator is broken up into subsequences, whereas with parameterization one gets a separate and unique full-period generator. SPRNG is based on parameterization, and it is its use of parameterization that has made SPRNG so successful. This is because parameterized generators allow SPRNG to provide high-quality random numbers for simulation on diverse parallel computers without the need for extra communication for random number generation and do so in a completely scalable way.

The second issue with parameterization is how it allows for reproducibility. At present, SPRNG computes the parameter values and seeds when a new generator is initialized. This is what allows for perfect reproducibility. This is because the values used for the parameter values and seeds are deterministically computed using algorithms implemented within SPRNG.

In seeking to explain how to use unpredictable random numbers in SPRNG while still allowing for reproducibility, it is required to define a new form of reproducibility.

Reproducibility in numerical simulation is essential for several reasons. However, it is not important that every computation be reproducible, just when reproducibility is required, that it can be achieved for a given computation. Moreover, SPRNG was designed for parallel computers, where reproducibility is a much more complicated issue. In fact, what SPRNG supports is the ability to rerun a computation in a reproducible manner on a differently configured system. However, there is one situation that SPRNG does not facilitate, that is to take a computation run on a parallel machine to be rerun in a reproducible manner on a single processor. This can be done, but it requires considerable intervention to achieve.

As such, while absolute reproducibility may not be essential, some form of reproducibility is required in simulation computations. Therefore, a new concept is defined and referred to as "forensic reproducibility" for this purpose. It can be said that a computation using random numbers is forensically reproducible if the original computation retains information sufficient for it to be rerun in some manner and on some system using the same random numbers. This concept is considerably less stringent than absolute reproducibility, but it satisfies the needs for reproducibility for both debugging and scientific publication. In addition, forensic reproducibility still allows one to document a computation completely.

Figure 3:
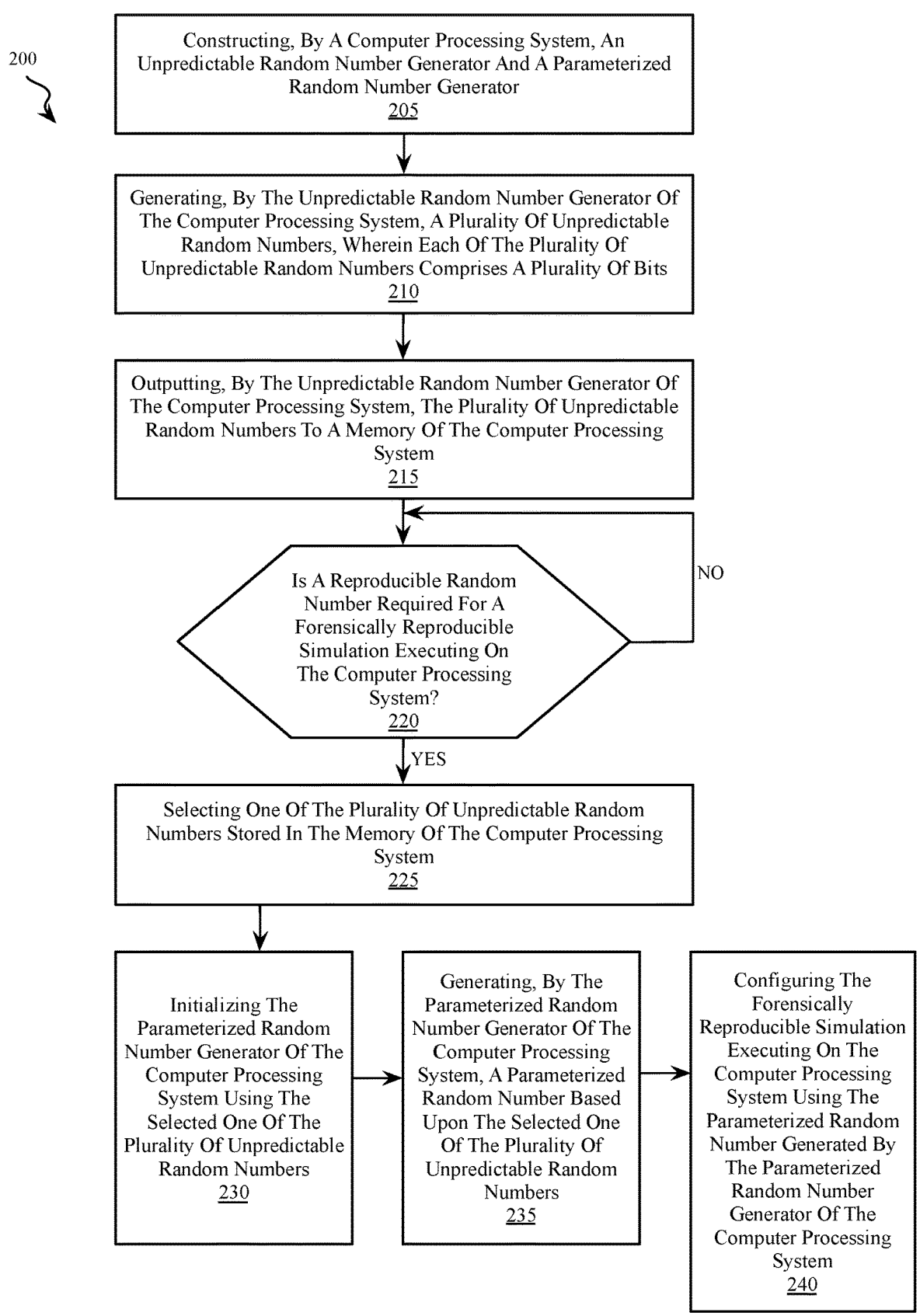
FIG. 3 is a flow diagram illustrating a method for generating random numbers for a forensically reproducible simulation, in accordance with an embodiment of the present invention.

FIG. 3 illustrates a flow diagram of a method 200 for generating random numbers for a forensically reproducible simulation, in accordance with an embodiment of the present invention. At a first step 205, the method includes, constructing, by a computer processing system, an unpredictable random number generator and a parameterized random number generator.

At step 210, the method further includes, generating, by the unpredictable random number generator of the computer processing system, a plurality of unpredictable random numbers, wherein each of the plurality of unpredictable random numbers comprises a plurality of bits.

At step 215, the method continues by outputting, by the unpredictable random number generator of the computer processing system, the plurality of unpredictable random numbers to a memory of the computer processing system.

At step 220, if a reproducible random number is required for a forensically reproducible simulation executing on the computer processing system, the method continues at step 225 by selecting one of the plurality of unpredictable random numbers stored in the memory of the computer processing system. The method then continues at step 230 by initializing the parameterized random number generator of the computer processing system using the selected one of the plurality of unpredictable random numbers and then continues at step 235 by generating, by the parameterized random number generator of the computer processing system, a parameterized random number based upon the selected one of the plurality of unpredictable random numbers. The method ends at step 240 by configuring the forensically reproducible simulation executing on the computer processing system using the parameterized random number generated by the parameterized random number generator of the computer processing system.

Unpredictable random numbers cannot be used to generate random numbers used directly in simulation because doing so leads to a situation where reproducibility is not possible. While this is strictly not true, because one could store the output of the unpredictable random generator solely for the purpose of reproducibility. The problem is practicality. Large simulation routines consume more that $10^{18}$ random numbers, and storing them for potential future use is not feasible. In fact, many large simulations are already challenged with memory constraints that would forbid storing so many numbers.

However, it is possible to use unpredictable random numbers to provide the parameter values and seeds of parameterized random number generators (such as SPRNG) while still providing forensic reproducibility. This is because the parameter values and seeds are only needed at the time of initialization. In addition, to obtain a forensically reproducible result, the values generated unpredictably for the parameters and seeds could be stored so that the same random numbers could be used for subsequent computations. While $10^{18}$ random numbers for simulation might be generated, only data sets consisting of the initial parameter settings and seeds of at most a megabyte need be stored for each generator used. This will not impact performance, and will permit both the use of unpredictable random numbers and allow for forensic reproducibility.

In various embodiments, the present invention provides a method to use unpredictable random numbers in a forensically reproducible way. Thereby, allowing the use of widely available sources of unpredictable random numbers to be used in simulation. In accordance with the present invention, the unpredictable random numbers would not produce the actual numbers used in simulation, those would still come from pseudorandom number generators, but the pseudorandom number generators are initialized using unpredictable random numbers. In addition, the unpredictable random numbers used for initialization are retained in order to permit forensic reproducibility.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A computer implemented method for generating random numbers for configuring a forensically reproducible simulation, the method comprising:
    maintaining, by a computer processing system, an unpredictable random number generator and a parameterized random number generator;
    generating, by the unpredictable random number generator of the computer processing system, a plurality of unpredictable random numbers, wherein each of the plurality of unpredictable random numbers comprises a plurality of bits;
    outputting, by the unpredictable random number generator of the computer processing system, the plurality of unpredictable random numbers to a memory of the computer processing system; and
    when a reproducible random number is required for a forensically reproducible simulation executing on the computer processing system:
        selecting one of the plurality of unpredictable random numbers stored in the memory of the computer processing system;
        initializing the parameterized random number generator of the computer processing system using the selected one of the plurality of unpredictable random numbers;
        generating, by the parameterized random number generator of the computer processing system, a parameterized random number based upon the selected one of the plurality of unpredictable random numbers; and
        configuring the forensically reproducible simulation executing on the computer processing system using the parameterized random number generated by the parameterized random number generator of the computer processing system.

2. The method of claim 1, further comprising running the forensically reproducible simulation executing on the computer processing system, repeatedly, by selecting the same one of the plurality of unpredictable random numbers stored in the memory of the computer processing system to initialize the parameterized random number generator.

3. The method of claim 1, further comprising generating a seed value for the unpredictable random number generator prior to generating, by the unpredictable random number generator of the computer processing system, a plurality of unpredictable random numbers, wherein each of the plurality of unpredictable random numbers comprises a plurality of bits.

4. The method of claim 3, wherein the seed value is generated based upon one or more physical entropy sources.

5. The method of claim 4, wherein the one or more physical entropy sources are selected from radioactive decay, a quantum effect, electronic noise, air turbulence, movement of a tracking device mouse strokes and timing between keyboard keystrokes.

6. The method of claim 1, wherein the unpredictable random number generator is an Intel® Digital Random Number Generator (DRNG).

7. The method of claim 1, wherein the parameterized random number generator is a Scalable Parallel Random Number Generator (SPRNG).

8. A computer processing system, comprising:
    a processor; and
    a memory communicatively coupled to the processor,
    wherein the memory stores program instructions, that when executed by the processor, cause the processor to perform a method comprising:
        maintaining an unpredictable random number generator and a parameterized random number generator;
        generating a plurality of unpredictable random numbers, wherein each of the plurality of unpredictable random numbers comprises a plurality of bits;
        outputting the plurality of unpredictable random numbers to the memory of the computer processing system; and
        when a reproducible random number is required for a forensically reproducible simulation executing on the computer processing system, the program instructions that when executed by the processor cause the processor further to perform:
            selecting one of the plurality of unpredictable random numbers stored in the memory of the computer processing system;
            initializing the parameterized random number generator of the computer processing system using the selected one of the plurality of unpredictable random numbers;
            generating, by the parameterized random number generator of the computer processing system, a parameterized random number based upon the selected one of the plurality of unpredictable random numbers; and
            configuring the forensically reproducible simulation executing on the computer processing system using the parameterized random number generated by the parameterized random number generator of the computer processing system.

9. The system of claim 8, wherein the program instructions that when executed by the processor further cause the processor to run the forensically reproducible simulation executing on the computer processing system, repeatedly, by selecting the same one of the plurality of unpredictable random numbers stored in the memory of the computer processing system to initialize the parameterized random number generator.

10. The system of claim 8, wherein the program instructions that when executed by the processor further cause the processor to generate a seed value for the unpredictable random number generator prior to generating, by the unpredictable random number generator of the computer processing system, a plurality of unpredictable random numbers, wherein each of the plurality of unpredictable random numbers comprises a plurality of bits.

11. The method of claim 10, wherein the seed value is generated based upon one or more physical entropy sources.

12. The method of claim 11, wherein the one or more physical entropy sources are selected from radioactive decay, a quantum effect, electronic noise, air turbulence, movement of a tracking device mouse strokes and timing between keyboard keystrokes.

13. The method of claim 8, wherein the unpredictable random number generator is an Intel® Digital Random Number Generator (DRNG).

14. The method of claim 8, wherein the parameterized random number generator is a Scalable Parallel Random Number Generator (SPRNG).

15. A non-transitory, computer-readable storage medium comprising program instructions stored thereon, wherein the program instructions are configured to implement:
  maintaining an unpredictable random number generator and a parameterized random number generator;
  generating a plurality of unpredictable random numbers, wherein each of the plurality of unpredictable random numbers comprises a plurality of bits;
  outputting the plurality of unpredictable random numbers to the memory of the computer processing system; and
  when a reproducible random number is required for a forensically reproducible simulation executing on the computer processing system, the program instructions executing by the processor further to implement:
    selecting one of the plurality of unpredictable random numbers stored in the memory of the computer processing system;
    initializing the parameterized random number generator of the computer processing system using the selected one of the plurality of unpredictable random numbers;
    generating, by the parameterized random number generator of the computer processing system, a parameterized random number based upon the selected one of the plurality of unpredictable random numbers; and
    configuring the forensically reproducible simulation executing on the computer processing system using the parameterized random number generated by the parameterized random number generator of the computer processing system.

16. The computer readable storage medium of claim 15, wherein the program instructions executing by the processor further to implement running the forensically reproducible simulation executing on the computer processing system, repeatedly, by selecting the same one of the plurality of unpredictable random numbers stored in the memory of the computer processing system to initialize the parameterized random number generator.

17. The computer readable storage medium of claim 15, wherein the program instructions executing by the processor further to implement generating a seed value for the unpredictable random number generator prior to generating, by the unpredictable random number generator of the computer processing system, a plurality of unpredictable random numbers, wherein each of the plurality of unpredictable random numbers comprises a plurality of bits.

18. The computer readable storage medium of claim 17, wherein the seed value is generated based upon one or more physical entropy sources.

19. The computer readable storage medium of claim 15, wherein the unpredictable random number generator is an Intel® Digital Random Number Generator (DRNG).

20. The computer readable storage medium of claim 15, wherein the parameterized random number generator is a Scalable Parallel Random Number Generator (SPRNG).

* * * * *